United States Patent [19]

Hartman et al.

[11] 4,403,091

[45] Sep. 6, 1983

[54] UNGELLED HYDROXY GROUP-CONTAINING OLIGOMERS

[75] Inventors: Marvis E. Hartman, Pittsburgh; Barbara A. Greigger, Allison Park; Rostyslaw Dowbenko, Gibsonia, all of Pa.

[73] Assignee: PPG Industries, Inc., Pittsburgh, Pa.

[21] Appl. No.: 425,754

[22] Filed: Sep. 28, 1982

[51] Int. Cl.³ ..................... C08G 63/44; C08G 69/44
[52] U.S. Cl. .................................................. 528/288
[58] Field of Search ............... 525/438, 443; 528/288, 528/297, 44

[56] References Cited

U.S. PATENT DOCUMENTS

| | | | |
|---|---|---|---|
| 3,006,897 | 10/1961 | Parker | 260/75 |
| 3,114,735 | 12/1963 | Pigott | 260/75 |
| 3,329,739 | 7/1967 | Semroc | 260/850 |
| 3,376,272 | 4/1968 | Masters et al. | 260/78.4 |
| 3,376,273 | 4/1968 | Masters et al. | 260/78.4 |
| 3,389,103 | 6/1968 | Sekmakas | 260/21 |
| 3,478,126 | 11/1969 | Turpin | 260/835 |
| 3,690,927 | 9/1972 | Parker et al. | 117/93.31 |
| 3,857,817 | 12/1974 | Henshaw et al. | 260/67.6 R |
| 3,882,189 | 5/1975 | Hudak | 525/443 X |
| 3,912,790 | 10/1975 | Chang et al. | 260/849 |
| 3,919,144 | 11/1975 | Formaini et al. | 525/443 X |
| 3,928,420 | 12/1975 | Fang | 260/475 P |
| 3,928,492 | 12/1975 | Fang | 260/850 |
| 4,017,556 | 4/1977 | Wang | 260/856 |
| 4,021,505 | 5/1977 | Wang | 260/856 |
| 4,028,309 | 6/1977 | Fang | 260/77.5 AN |
| 4,046,729 | 9/1977 | Scriven et al. | 525/443 X |
| 4,080,318 | 3/1978 | Smith et al. | 525/443 X |
| 4,101,603 | 7/1978 | Smith et al. | 260/850 |
| 4,104,240 | 8/1978 | Buter | 260/39 P |
| 4,113,702 | 9/1978 | Psencik | 528/75 |
| 4,144,395 | 3/1979 | Murphy et al. | 560/200 |
| 4,158,652 | 6/1979 | Koleske et al. | 260/29.4 UA |
| 4,165,345 | 8/1979 | Smith et al. | 525/419 |
| 4,169,825 | 10/1979 | Yapp et al. | 260/31.6 |
| 4,171,423 | 10/1979 | Smith et al. | 528/289 |
| 4,271,062 | 6/1981 | Boomgaard et al. | 260/39 P |
| 4,279,800 | 7/1981 | Boomgaard et al. | 260/39 P |

*Primary Examiner*—Lucille M. Phynes
*Attorney, Agent, or Firm*—William J. Uhl

[57] ABSTRACT

Ungelled hydroxyl-containing oligomers and their method of preparation are disclosed. The oligomers can be prepared by reacting an organic isocyanate with a half-ester formed from reacting a polyol with a 1,2-dicarboxylic acid anhydride followed by reaction with an epoxide. The oligomers are useful as resinous binders in high solids coating compositions. The coating compositions can be applied by spraying and do not result in a tacky overspray common with many high solids coating compositions.

25 Claims, No Drawings

UNGELLED HYDROXY GROUP-CONTAINING OLIGOMERS

BACKGROUND OF THE INVENTION

1. Field of the Invention

The present invention relates to novel oligomers and to their method of preparation.

2. Brief Description of the Prior Art

U.S. Pat. Nos. 4,208,309 and 4,113,702 disclose coating compositions comprising a mixture of a hydroxyl-containing polyester and a polyisocyanate curing agent. The polyester is formed from reacting a polyol, a polycarboxylic acid or anhydride and a monoepoxide. There is substantially no reaction between the polyisocyanate and the polyester until the mixture is applied to a substrate and cured.

There are a number of problems associated with the above-mentioned prior art. In the formation of the hydroxyl-containing polyester, if the choice of reactants and the reaction conditions are not carefully conntrolled, there can be a considerable amount of polyesterification and unreacted polyol formed. Unreacted polyol results in volatile organic content in the resultant coating composition which is undesirable because of increasingly stringent governmental emission standards. Another problem is the low viscosity of the polyester. Low viscosity is, of course, desirable for the formation of high solids coating compositions. However, if the coating compositions are spray applied, there will be an overspray which misses the substrate and accumulates in the painting booth. The low viscosity uncured resinous materials do not harden with time and can become very tacky and slippery creating a hazard to the personnel working in the area.

The present invention overcomes the aforementioned problems by providing a composition which results in substantially dry overspray and low volatile contents. In the present invention, a polyol is reacted with a 1,2-dicarboxylic anhydride under reaction conditions sufficient to form the half-ester with substantially no polyesterification product and unreacted polyol. This product is then reacted with an organic isocyanate such as a polyisocyanate. Reaction with a polyisocyanate results in chain extension and molecular weight buildup which is sufficient to overcome the tacky overspray problem mentioned above. This reaction product which contains carboxylic acid groups is then reacted with an epoxide to form a hydroxyl group-containing oligomer.

SUMMARY OF THE INVENTION

In accordance with the present invention, an ungelled hydroxyl-containing oligomer and a process for its preparation are provided.

The oligomer is believed to have the following structural formula:

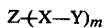

where Z is the residue of an organic isocyanate remaining after reaction with X; X is the residue of a half-ester after reaction with an organic isocyanate and with an epoxide, said half-ester being formed from reacting a 1,2-dicarboxylic acid anhydride with a polyol; Y is the residue of an epoxide after ring opening with a carboxylic acid group of X; and m corresponds to the number of isocyanate groups reacted with X.

The oligomer can be formed from:

(A) reacting a 1,2-dicarboxylic acid anhydride with a polyol under conditions sufficient to form a half-ester with substantially no polyesterification product, (B) reacting said half-ester with an organic isocyanate under conditions sufficient to form an intermediate reaction product containing carboxylic acid groups, (C) reacting said intermediate reaction product with an epoxide under conditions sufficient to form the ungelled hydroxyl-containing oligomer.

DETAILED DESCRIPTION

In preparing the oligomers of the present invention, a 1,2-dicarboxylic acid anhydride is reacted with a polyol under conditions sufficient to ring open the anhydride forming a half-ester with substantially no polyesterification occurring (i.e., both carboxyl groups of the anhydride esterified by polyol in a recurring manner). By this is meant that less than 10, preferably less than 5 percent by weight of polyester is formed.

In bringing an anhydride and a polyol together under suitable reaction conditions, reaction can occur in at least two ways. The desired reaction mode involves opening the anhydride ring with hydroxyl, i.e.,

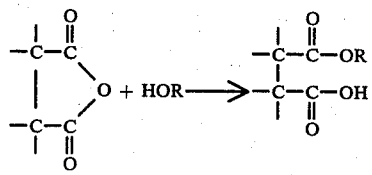

Alternately, carboxyl groups formed by opening of the anhydride ring can react with hydroxyl groups to give off water; a condensation reaction. The latter reaction is not desired since it can lead to polycondensation reactions resulting in products with broad molecular weight distributions.

To achieve reaction, the 1,2-dicarboxylic acid anhydride and polyol are contacted together, usually by mixing the two ingredients together in a reaction vessel. Preferably, reaction is conducted in the presence of an inert atmosphere such as nitrogen and in the presence of a solvent to dissolve solid ingredients and/or to lower the viscosity of the reaction mixture. Examples of suitable solvents are high boiling materials, and include, for example, ketones such as methyl amyl ketone, diisobutyl ketone, methyl isobutyl ketone; aromatic hydrocarbons such as toluene and xylene; as well as other organic solvents such as dimethylformamide and N-methyl pyrrolidone.

For the desired ring-opening reaction and half-ester formation, a 1,2-dicarboxylic acid anhydride is used. The corresponding acid would result in esterification by condensation to eliminate water which would have to be removed by distillation which, under these conditions, would promote undesired polyesterification. Also, the reaction temperature is preferably low, that is, no greater than 150° C., and preferably less than 130° C., and usually within the range of 40° to 150° C., preferably 40° to 130° C. Temperatures greater than 150° C. are undesirable because they promote polyesterification, whereas temperatures less than 40° C. are undesirable because of sluggish reaction.

The time of reaction can vary somewhat depending principally on the temperature of reaction. Usually, reaction times will be from as low as 10 minutes to as high as 24 hours.

Preferably, the equivalent ratio of anhydride (expressed as equivalents of anhydride as opposed to equivalents of carboxyl) to hydroxyl of the polyol is less than or equal to 1, more preferably from about n-1:n where n is the number of hydroxyl groups in the polyol.

The major (i.e., greater than 50 percent by weight based on total weight of the half-ester) and preferred product which is formed is a hydroxy group-containing half-ester which is believed to be that of the structure:

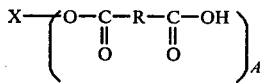

where X is the residue of a polyol after reaction with the 1,2-dicarboxylic acid anhydride, R is the organic moiety associated with the anhydride and is an aliphatic or an aromatic group, and $A = 1$ to $n-1$ where n is the number of hydroxyl groups of the polyol. Preferably, $n = 2$ to 3.

Among the anhydrides which can be used in the practice of the invention are those which, exclusive of the carbon atoms in the anhydride moiety, contain from about 2 to 30 carbon atoms. Examples include aliphatic including cycloaliphatic, olefinic and cycloolefinic anhydrides, as well as aromatic anhydrides. Substituted aliphatic and aromatic anhydrides in which the substituents would not adversely affect the reactivity of the anhydride or the properties of the resultant oligomer can also be used. Examples of substituents would be chloro and alkoxy. Examples of anhydrides include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, methylhexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols which can be used are those which contain from about 2 to 20 carbon atoms. Preferred are aliphatic polyols, particularly aliphatic diols and triols, most preferably, those containing from 2 to 10 carbon atoms. Examples include ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, trimethylolpropane, 2,2,4-trimethylpentane-1,3-diol, and 2,2-dimethyl-3-hydroxypropyl 2,2-dimethyl-3-hydroxypropionate. Preferred are those aliphatic diols and triols selected from the class consisting of neopentyl glycol, 2,2,4-trimethylpentane-1,3-diol, 2,2-dimethyl-3-hydroxypropyl 2,2-dimethyl-3-hydroxypropionate, diethylene glycol, dipropylene glycol, 1,6-hexanediol and trimethylolpropane. Higher functionality polyols such as tetrols can be used but they are not preferred. An example would be 1,2,3,4-butanetetrol.

After the 1,2-dicarboxylic acid anhydride and polyol are reacted together, the resultant half-ester is further reacted with an organic isocyanate such as a polyisocyanate which chain extends the half-ester to form an oligomer with carboxylic acid groups. In the case of hydroxyl group-containing half-esters, chain extension occurs principally through reaction of the hydroxyl groups of the half-ester with the isocyanate groups of the polyisocyanate to form a polyurethane oligomer.

Although the structure of the chain-extended product is not known with certainty, the major product (i.e., greater than 50 percent by weight based on total oligomer weight) is believed to be a polyurethane of the structure:

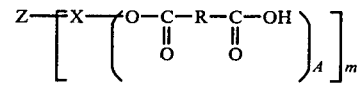

where Z is the residue of the polyisocyanate after reaction with X; X, R and A are as defined above and m corresponds to the number of isocyanate groups which are reacted with the polyol. Preferably $m = 2$ to 3, most preferably 2.

The half-ester and the isocyanate are reacted together by contacting under conditions sufficient to form the carboxylic acid group-containing oligomer. Preferably, the half-ester and the organic isocyanate are reacted together in the presence of an inert atmosphere such as nitrogen. Reaction can be conducted neat or, as is more usual, in the presence of organic solvent such as those mentioned above in connection with the hydroxyl group-containing half-ester formation.

The half-ester and the organic isocyanate can be contacted together by simply mixing the two together and preferably conducting the reaction under conditions to encourage reaction of the isocyanate with the hydroxyl groups of the polyol residue and minimize reaction with carboxylic acid groups of the anhydride residue. It is preferred to add isocyanate to half-ester incrementally so as to obtain higher yields of the desired carboxylic acid group-containing oligomers. The proportions of half-ester and isocyanate which are reacted together are not particularly critical, although care should be taken such that there is no unreacted isocyanate in the final product. Preferably, to obtain maximum conversion to the desired carboxylic acid group-containing oligomer, the equivalent ratio of isocyanate to hydroxyl groups is preferably from about 0.5 to 1:1. Ratios less than 0.5:1 result in less than optimum amount of chain-extended product, whereas ratios greater than 1:1 result in unwanted unreacted isocyanate.

The temperature of reaction should be less than 120° C., preferably less than 100° C., and usually within the range of about 50° to 100° C. Temperatures higher than 120° C. are undesirable because of competition between the hydroxyl groups and the carboxylic acid groups for reaction with the isocyanate groups. Reaction temperatures of less than 50° C. are undesirable because of sluggish reaction.

The time of reaction depends on the temperature of reaction and the presence or absence of catalyst. In general, reaction times will vary from about 30 minutes to 6 hours.

The isocyanates which are used are preferably those having an average NCO functionality greater than 1, preferably greater than 1.5, and up to about 2. Higher functionality polyisocyanates, i.e., those with equivalencies greater than 2 are not preferred because of considerable chain branching and gelation problems. The organic polyisocyanates which can be used are aliphatic including cycloaliphatic polyisocyanates and aromatic polyisocyanates. Preferred are cycloaliphatic and aromatic polyisocyanates. Examples of such isocyanates include para-phenylene diisocyanate, biphenyl diisocyanate, toluene diisocyanate, 1,4-tetramethylene diisocyanate, hexamethylene diisocyanate, methylene-bis-phenyl isocyanate, isophorone diisocyanate, methylcyclohexyl isocyanate, and methylenebis(cyclohexyl isocyanate). There can also be employed isocyanate-terminated adducts of diols such as ethylene glycol, 1,4-butylene glycol and polyalkylene glycols. While diisocyanates are preferred, higher polyisocyanates can be utilized as part of the organic polyisocyanate. Examples are 1,2,4-benzene triisocyanate and polymethylene polyphenyl isocyanate.

The carboxylic acid group-containing oligomer is reacted with an epoxide under conditions to ring open the epoxide forming the resultant hydroxyl-containing oligomer. In this reaction, the carboxylic acid groups open the epoxide forming the corresponding ester group and a secondary hydroxyl group. Although the structure of the reaction product is not known with certainty, the major product (i.e., greater than 50 percent by weight based on total oligomer weight) is believed to be of the structure:

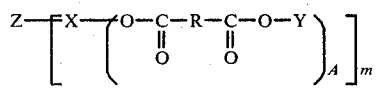

where Y is the residue of the monoepoxide after the reaction with carboxylic acid groups, X, R, A, m and Z are as defined above.

The carboxylic acid group-containing oligomer and the epoxide are reacted together by contacting under conditions sufficient to form the desired hydroxyl group-containing oligomer. Preferably, the carboxylic acid group-containing oligomer and the epoxide are reacted in the presence of an inert atmosphere such as nitrogen. Reaction can be conducted neat or, as is more usual, in the presence of an organic solvent such as those mentioned above. The carboxylic acid group-containing oligomer and the epoxide can be contacted simply by mixing the two together. Preferably, a monoepoxide is used and it is added incrementally so as to better control the reaction and to obtain higher yields of the desired product. The proportions of the carboxylic acid group-containing oligomer and the epoxide which are reacted together are not critical. Broadly, the equivalent ratio of epoxy to carboxylic acid can be from about 1.0 to 2.5:1. However, to obtain maximum conversion to the desired product, the equivalent ratio of epoxy to carboxylic acid groups is preferably about 1:1. Ratios less than 1:1 result in less than optimum amount of desired product, whereas ratios greater than 2.5:1 result in unreacted epoxy.

Temperature of reaction should be less than 160° C., preferably less than 150° C., and usually within the range of 60° to 150° C. Temperatures higher than 160° C. are undesirable because of competition between the epoxy groups and hydroxyl groups for the carboxylic acid groups resulting in undesirable polyesterification reactions. Reaction temperatures less than 60° C. are undesirable because of sluggish reaction. Further, a catalyst such as an organophosphine is preferably used. Examples of suitable catalysts of this sort would be triarylphosphine such as triphenylphosphine. Examples of other catalysts include amines such as triethylamine and inorganic bases such as potassium hydroxide. When catalyst is used, it is used in amounts of about 0.1 to 2 percent by weight based on total weight of reactants.

The time of reaction depends on how the reactants are contacted, the temperature of reaction and the presence or absence of catalyst. In general, reaction times will vary from about 30 minutes to 24 hours. The rate and extent of reaction may be monitored by measuring the decrease in acid number.

The epoxides useful in the practice of the invention are 1,2-epoxides. Preferred are monoepoxides. Examples are those represented by the following structural formula:

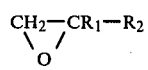

where $R_1$ is hydrogen or methyl and $R_2$ is hydrogen, alkyl including cycloalkyl, aryl preferably containing from 1 to 18 carbon atoms, substituted alkyl and aryl moieties, as long as the substituents do not interfere with reaction of the monoepoxide with the carboxylic acid group-containing polyurethane, such as $-CH_2OR_3$ and

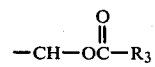

where $R_3$ is alkyl including cycloalkyl, aryl and substituted aryl including cycloalkyl and aryl in which the alkyl and aryl moieties contain from 1 to 18 carbon atoms.

Illustrative examples of the monoepoxides are alkylene oxides containing from 2 to 8 carbon atoms including ethylene oxide, propylene oxide, 1,2-butylene oxide, 1,2-pentene oxide, styrene oxide and glycidol. Examples of other suitable materials are glycidyl esters of monobasic acids such as glycidyl acrylate, glycidyl methacrylate, glycidyl acetate, glycidyl butyrate; linseed glycidyl ester and glycidyl ethers of alcohols and phenols such as butyl glycidyl ether and phenyl glycidyl ether.

Particularly preferred are glycidyl ethers or esters of acids or alcohols containing an acyclic group of from about 4 to 24 carbon atoms. Typical examples of acids and alcohols include the saturated straight chain and branched chain series of fatty alcohols and acids as well as ethylenically unsaturated species and mixtures thereof, including octanoic or 2-ethylhexanoic acid at the lower end proceeding to lauric, palmitic, stearic, etc., at the upper end of the group. Highly branched tertiary carboxylic acid mixtures such as Shell's Versatic 911 acids are particularly useful herein. Fatty alcohols of equivalent chain length are used for the preparation of the glycidyl ethers. Examples include 2-ethylhexanol and lauryl alcohol.

The oligomers of the present invention are ungelled. By the term "ungelled" or "non-gelled" is meant the oligomer is substantially free of crosslinking and has an intrinsic viscosity when dissolved in a suitable solvent without depolymerization. The intrinsic viscosity of such a product is an indication of molecular weight. A gelled product, on the other hand, since it has an essentially infinitely high molecular weight, will have an intrinsic viscosity too high to measure.

The oligomers of the present invention preferably have molecular weights of 3000 or less, more preferably 2000 or less, on a number average basis. Also, the oligomer will preferably contain at least 10, more preferably from 15 to 60 percent by weight of anhydride residue, the percentage by weight being based on total weight of reactants used in preparing the oligomer.

To form a curable composition, the hydroxyl group-containing polyurethanes, as described above, are combined with a crosslinking agent. The crosslinking agent is one which is capable of reacting with the active hydrogens in the polyester to give a thermoset composition upon curing. Examples of suitable crosslinking agents are aminoplasts and polyisocyanates including blocked polyisocyanates.

Aminoplasts are obtained by condensation reaction of formaldehyde with an amine or an amide. The most common amines or amides are melamine, urea or benzoguanamine. However, condensation with other amines or amides may be employed. While the aldehyde employed is most often formaldehyde, other aldehydes such as acetaldehyde, crotonaldehyde, benzaldehyde and furfural may be used. The aminoplast contains methylol or similar alkylol groups and preferably at least a portion of these alkylol groups are etherified by reaction with alcohol to provide organic solvent-soluble resins. Any monohydric alcohol can be employed for this purpose including such alcohols as methanol, ethanol, butanol and hexanol. Preferably, the aminoplasts which are used are melamine, urea or benzoguanamine-formaldehyde condensates etherified with alcohol containing 1 to 4 carbon atoms such as methanol, ethanol, butanol or mixtures thereof.

The amount of aminoplast which is used is from about 10 to 70 percent by weight, preferably, 30 to 50 percent by weight, based on total weight of the aminoplast and polyester. Amounts less than 10 percent by weight usually result in insufficient cure, whereas amounts greater than 70 percent by weight serve no particular benefit.

Polyisocyanates and blocked polyisocyanates may also be used as curing agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. A particularly useful isocyanate is the biuret from 1,6-hexamethylene diisocyanate commercially available from Bayer AG as DESMODUR N.

The polyisocyanate may optionally be blocked. Examples of suitable blocking agents are those materials which would unblock at elevated temperatures such as lower aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application.

The amount of polyisocyanate or blocked polyisocyanate curing agent which is used can vary between about 0.2 to 1.5, preferably from 0.3 to 1.3 equivalents of NCO per equivalent of active hydrogen of the polyurethane.

The polyurethanes described above can be used in the formulation of high solids coating compositions. When combined with a crosslinking agent, they can be used in the formulation of thermosetting high solids coating compositions. The high solids coating compositions preferably contain greater than 50 percent, and most preferably greater than 60 percent by weight non-volatile solids exclusive of pigments, solvents and other non-reactive components. The solids content is determined by heating the composition to 105°–110° C. for 1 to 2 hours to drive off the volatiles.

Besides the polyurethane and optionally the crosslinking agent, the high solids coating compositions can optionally contain pigment, other hydroxyl functional polymers, liquid diluent, plasticizer, antioxidants, UV light absorbers, surfactants, flow control agents, as is well known in the art. Examples of flow control agents are crosslinked polymeric microparticles such as described in U.S. Pat. No. 4,147,688.

Coating compositions employing the polyurethanes of the present invention are designed for application by spraying, although other conventional methods of coating including brushing, dipping and flow coating can be employed, if desired. However, as mentioned above, they are especially formulated for spraying where they do not result in tacky overspray common with many high solids coating compositions. Usual spray techniques and equipment are utilized. High solids coatings using the polyurethanes of the present invention can be applied virtually over any substrate including wood, metal, glass, cloth, plastics, foams and the like, as well as over various primers. The coating compositions are particularly useful over resilient and rubbery substrates such as foam rubber, polyurethane foam and vinyl foam, and on soft metal surfaces such as mild steel and aluminum. Coating compositions employing polyurethanes of the present invention are useful for a wide variety of applications. They can be used for coating automotive parts such as automobile bodies and truck cabs. Also, they can be used for other coating applications such as coatings for appliance parts such as refrigerators and washing machines, and they can also be used for coil coating applications.

In general, coating thicknesses will vary depending upon the application desired. In general, coatings from about 0.1 to 5 mils have been found to be useful in most applications.

After application to the substrate, the coatings are cured. Curing is usually conducted at a temperature of about 100° to 200° C. and, in most cases, the cure schedule is from about 10 to 30 minutes at about 130° to 180° C. Higher or lower temperatures with corresponding longer or shorter times can be utilized, although the exact cure schedule best employed depends upon the nature of the substrate as well as the particular components used in formulating the coating compositions. With aminoplast curing agents, acid catalysts can be employed, if desired, as they usually permit the use of lower temperature and/or shorter times for cure.

The invention will be further described by reference to the following examples. Unless otherwise indicated, all parts are by weight.

EXAMPLES

The following examples show the preparation of a polyurethane formed from reacting a 1,2-dicarboxylic acid anhydride with a polyol under conditions to form the hydroxyl group-containing half-ester, followed by reacting the half-ester with a diisocyanate to form a carboxylic acid-containing polyurethane, followed by reaction with a monoepoxide to form an ungelled hydroxyl-containing polyurethane. High solids coating compositions were then formulated with the hydroxyl-containing polyurethanes as the resinous binder.

EXAMPLE I

A neopentyl glycol-phthalic anhydride-toluene diisocyanate-propylene oxide condensate (1:1:1:1 equivalent ratio) was prepared from the following ingredients:

| Ingredients | Parts by Weight in Grams |
| --- | --- |
| Charge I | |
| Neopentyl glycol | 377.2 |
| Phthalic anhydride | 536.8 |
| Methyl amyl ketone | 200.0 |
| Charge II | |
| Toluene diisocyanate (20%/80% 2,4-/2,6-isomer mixture) | 315.6 |
| Charge III | |
| Triphenylphosphine | 7.2 |
| Methyl amyl ketone | 25.0 |
| Charge IV | |
| Propylene oxide | 210.4 |

Charge I was added to a 3-liter flask and heated to 100° C. under a nitrogen blanket and held for 1½ hours at this temperature. An infrared (IR) scan of the reaction mixture showed only a trace of unreacted anhydride and an acid value of 188.5 (theory 182.7 for half-ester).

The reaction mixture was thinned with an additional 255 grams of methyl amyl ketone and cooled to 50° C. followed by the gradual addition of the toluene diisocyanate (TDI) over the period of about 2 hours with the temperature of the reaction mixture being maintained between 50° and 70° C. After the TDI addition was complete, the reaction mixture was heated to 70° C. for 2 hours to complete the reaction. An IR scan indicated the presence of only trace amounts of unreacted isocyanate (—NCO).

The temperature of the reaction mixture was raised to 120° C. and Charge III was then added over a 5-minute period, followed by the gradual addition of the propylene oxide over a 2-hour period while maintaining the reaction mixture temperature of about 120° C. to complete the reaction forming the desired polyurethane.

The reaction mixture had a solids content (105° C. for 2 hours) of 75.5 percent, an acid value of 0.2, a hydroxyl value of 129.7 and an infinite epoxy equivalent.

EXAMPLE II

A neopentyl glycol-hexahydrophthalic anhydride-methylene-bis-(4-cyclohexyl isocyanate)-propylene oxide condensate (1:1:1:1 equivalent ratio) was prepared from the following ingredients:

| Ingredients | Parts by Weight in Grams |
| --- | --- |
| Charge I | |
| Neopentyl glycol | 558.4 |
| Hexahydrophthalic anhydride | 826.8 |
| Methyl amyl ketone | 720.0 |
| Charge II | |
| Methylene-bis-(4-cyclohexyl isocyanate) | 703.4 |
| Charge III | |
| Triphenylphosphine | 12.0 |
| Methyl amyl ketone | 80.0 |
| Charge IV | |
| Propylene oxide | 311.4 |

Charge I was added to a 5-liter flask and heated to 75° C. under a nitrogen blanket. The mixture exothermed with the temperature reaching 100° C. The reaction was held for 2 hours at this temperature. An IR scan of the reaction mixture showed no unreacted anhydride and an acid value of 146 (theory 143.1 for half-ester).

The reaction mixture was cooled to 50° C. followed by the gradual addition of the methylene-bis-(4-cyclohexyl isocyanate) over the period of about 1 hour with the temperature of the reaction mixture being maintained between 50° and 70° C. After the isocyanate addition was complete, the reaction mixture was held at 70° C. for 2 hours to complete the reaction. An IR scan indicated the presence of only trace amounts of unreacted —NCO.

The temperature was raised to 120° C. and Charge III was then added to the reaction mixture over a 5-minute period, followed by the gradual addition of the propylene oxide over a 2-hour period while maintaining the reaction mixture temperature of about 120° C. to complete the reaction forming the desired polyurethane.

The reaction mixture had a solids content (105° C. for 2 hours) of 75.1 percent, an acid value of 9.6, a hydroxyl value of 94.1 and an infinite epoxy equivalent.

EXAMPLE III

A neopentyl glycol-hexahydrophthalic anhydride-methylene-bis-(4-cyclohexyl isocyanate)-CARDURA E condensate (1:1:1:1 equivalent ratio) was prepared from the following ingredients:

| Ingredients | Parts by Weight in Grams |
| --- | --- |
| Charge I | |
| Neopentyl glycol | 390.6 |
| Hexahydrophthalic anhydride | 578.4 |
| Methyl amyl ketone | 800.0 |
| Charge II | |
| Methylene-bis-(4-cyclohexyl isocyanate) | 495.9 |
| Charge III | |
| CARDURA E[1] | 927.4 |

[1]Glycidyl ester of Versatic acid, commercially available from Shell Chemical Co.

Charge I was added to a 5-liter flask and heated to 70° C. under a nitrogen blanket. The mixture exothermed with the temperature reaching 100° C. The reaction was held for 1 hour at this temperature. An IR scan of the reaction mixture showed no unreacted anhydride and an acid value of 122.9 (theory 119.1 for half-ester).

The reaction mixture was cooled to 50° C. followed by the gradual addition of the polyisocyanate over the period of about 1 hour with the temperature of the reaction mixture being maintained between 50° and 70° C. After the isocyanate addition was complete, the reaction mixture was heated to 85° C. for 2 hours to complete the reaction. An IR scan indicated the absence of unreacted —NCO.

Charge III was then added to the reaction mixture over a 5-minute period, and the temperature raised to 120° C. The temperature of the reaction mixture was maintained at about 120° C. for 6 hours to complete the reaction forming the desired polyurethane.

The reaction mixture had a solids content (105° C. for 2 hours) of 69.0 percent, an acid value of 10.3, a hydroxyl value of 77.6 and an infinite epoxy equivalent.

EXAMPLE IV

A high solids coating composition using the polyurethane of Example I and an aminoplast curing agent was prepared by mixing together the following ingredients:

| Ingredients | Parts by Weight in Grams |
|---|---|
| CYMEL 303[1] | 36.0 |
| Polyurethane of Example I | 112.0 |
| 50% by weight of para-toluenesulfonic acid in methanol | 2.4 |
| Methyl amyl ketone | 36.6 |

[1]Aminoplast curing agent commercially available from American Cyanamid Company.

The coating composition contained 65 percent solids, 1 percent para-toluenesulfonic acid catalyst based on resin solids. The polyurethane/aminoplast weight ratio was 70/30.

EXAMPLE V

A high solids coating composition using the polyurethane of Example III and an aminoplast curing agent was prepared by mixing together the following ingredients:

| Ingredients | Parts by Weight in Grams |
|---|---|
| CYMEL 303 | 36.0 |
| Polyurethane of Example III | 112.0 |
| 50% by weight para-toluenesulfonic acid in methanol | 2.4 |
| Methyl amyl ketone | 36.6 |

The coating composition contained 65 percent resin solids, 1 percent para-toluenesulfonic acid catalyst based on resin solids. The polyurethane/aminoplast weight ratio was 70/30.

EXAMPLE VI

A high solids coating composition using the polyurethane of Example I and a polyisocyanate curing agent was prepared by mixing together the following ingredients:

| Ingredients | Parts by Weight in Grams |
|---|---|
| DESMODUR N-75[1] | 44.9 |
| Polyurethane of Example I | 85.2 |
| Dibutyltin dilaurate | 1.04 |
| Methyl amyl ketone | 37.3 |

[1]75% solids solution in xylene of the biuret of 1,6-hexamethylene diisocyanate.

The coating composition contained 65 percent resin solids, 0.1 percent by weight dibutyltin dilaurate based on resin solids. The NCO/OH equivalent ratio was 1.2/1.0.

EXAMPLE VII

A high solids coating composition using the polyurethane of Example III and a polyisocyanate curing agent was prepared by mixing together the following:

| Ingredients | Parts by Weight in Grams |
|---|---|
| DESMODUR N-75 | 31.2 |
| Polyurethane of Example III | 98.8 |
| Dibutyltin dilaurate | 1.04 |
| Methyl amyl ketone | 32.0 |

The coating composition contained 65 percent resin solids, 0.1 percent by weight dibutyltin dilaurate catalyst based on resin solids. The NCO/OH equivalent ratio was 1.2/1.0.

The coating compositions were drawn down with a 0.003 Bird applicator on zinc phosphate pretreated steel panels. The coated panels were flashed for 10 minutes at ambient conditions and then baked at 275° F. (135° C.) for 15 minutes. Table I below shows the various properties for the coating compositions and for the cured coatings. The coating compositions were also sprayed onto metal substrates. After 8 hours, the overspray was dry and non-tacky.

TABLE I

Properties for Coating Compositions and Cured Coatings of Examples IV-VII

| Example No. | Viscosity #4 Ford Cup in seconds | Resin Solids at 110° C. for 1 hour | VOC[1] (g/l) | Solvent Resistance[2] | Pencil Hardness[3] | Impact Resistance[4] Forward/Reverse (cm-kg) | Overspray |
|---|---|---|---|---|---|---|---|
| IV | 40 | 64.3 | 371 | pass | 3H | 35/6 | non-tacky |
| V | 32.6 | 60.9 | 384 | pass | 2H | 58/7 | non-tacky |
| VI | 32.2 | 61.5 | 385 | pass | H | 58/6 | non-tacky |
| VII | 23.5 | 58.7 | 390 | pass (slight mar) | H | 58/6 | non-tacky |

[1]Volatile organic content determined according to ASTM D-3960-81.
[2]Solvent resistance determined by rubbing with normal hand pressure a xylene-saturated cloth back and forth (double rub) across the cured coating. A "pass" rating indicates the cured coating withstood 50 double rubs with essentially no marring of the coating.
[3]Pencil hardness determined by attempting to etch the cured coating with pencils of increasing hardness. When the coating is finally etched, this is reported as the pencil hardness.
[4]Impact resistance determined with a Gardner Impact Tester. The coating panels were subjected to increasing amounts of impact until the coating cracked. For reverse impact, the side opposite the coating being evaluated was impacted. For direct impact, the side of the coating being evaluated was impacted.

We claim:
1. A process for preparing an ungelled hydroxyl-containing oligomer comprising:
   (A) reacting a 1,2-dicarboxylic acid anhydride with a polyol under conditions sufficient to form a half-ester with substantially no polyesterification product,
   (B) reacting the half-ester with an organic isocyanate under conditions sufficient to form an intermediate reaction product containing carboxylic acid groups,
   (C) reacting said intermediate reaction product containing carboxylic acid groups with an epoxide under conditions sufficient to form the ungelled hydroxyl-containing oligomers.
2. The process of claim 1 in which the half-ester of (A) is a hydroxyl group-containing half-ester.
3. The process of claim 1 in which the isocyanate of (B) is a polyisocyanate.
4. The process of claim 1 in which the epoxide of (C) is a polyepoxide.

5. A process for preparing an ungelled hydroxyl-containing polyurethane oligomer comprising:
   (A) reacting a 1,2-dicarboxylic acid anhydride with a polyol under conditions sufficient to form a hydroxyl group-containing half-ester with substantially no polyesterification product,
   (B) reacting the hydroxyl group-containing half-ester with an organic polyisocyanate under conditions sufficient to form a polyurethane containing carboxylic acid groups,
   (C) reacting said polyurethane containing carboxylic acid groups with a monoepoxide under conditions sufficient to form the ungelled hydroxyl-containing polyurethane oligomer.

6. The process of claims 1 or 5 in which the 1,2-dicarboxylic acid anhydride is reacted with the polyol by mixing the two together and heating to a temperature less than 150° C.

7. The process of claims 1 or 5 in which the organic isocyanate is reacted with the half-ester by mixing the two together and heating to a temperature less than 120° C.

8. The process of claims 1 or 5 in which the intermediate containing carboxylic acid groups is reacted with the epoxide at a temperature less than 160° C. for a time sufficient to form the ungelled hydroxyl group-containing oligomer.

9. The process of claims 1 or 5 in which the anhydride-to-hydroxyl equivalent ratio in step (A) is less than or equal to 1.

10. An ungelled hydroxyl-containing oligomer having the following structure:

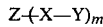

where Z is the residue of an organic isocyanate remaining after reaction with X; X is the residue of a half-ester after reaction with an organic isocyanate and with an epoxide, said half-ester being formed from reacting a 1,2-dicarboxylic acid anhydride with a polyol; Y is the residue of an epoxide after ring opening with a carboxylic acid group of X; and m corresponds to the number of isocyanate groups reacted with X.

11. The oligomer of claim 10 in which the organic isocyanate is a polyisocyanate.

12. The oligomer of claim 10 in which the half-ester contains both hydroxyl and carboxylic acid groups.

13. The oligomer of claim 10 in which the epoxide is a monoepoxide.

14. An ungelled hydroxyl-containing polyurethane oligomer having the following structure:

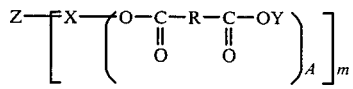

where Z is the residue of an organic polyisocyanate reacted with hydroxyl groups of X; X is the residue of a polyol reacted with isocyanate groups of Z and with anhydride groups; R is an aliphatic or an aromatic group; Y is the residue of a monoepoxide reacted with carboxylic acid groups; $A = 1$ to $n-1$ where n is the number of hydroxyl groups in the polyol; and m corresponds to the number of isocyanate groups reacted with the polyol residue.

15. The polyurethane of claim 14 in which R contains from 2 to 30 carbon atoms exclusive of the carbon atoms in the anhydride moiety.

16. The oligomer of claims 10 or 14 in which the polyol contains from 2 to 20 carbon atoms.

17. The oligomer of claims 10 or 14 in which the organic isocyanate is an aliphatic, cycloaliphatic or aromatic polyisocyanate.

18. The oligomer of claim 17 in which the organic polyisocyanate contains from 2 to 20 carbon atoms.

19. The oligomer of claims 10 or 14 in which the epoxide is selected from the class consisting of alkylene oxides containing from 2 to 20 carbon atoms, glycidyl esters of fatty acids containing from 5 to 25 carbon atoms and glycidyl ethers of fatty alcohols containing from 5 to 25 carbon atoms, as well as mixtures thereof.

20. A composition comprising the polyurethane of claims 10 or 14 in combination with a curing agent.

21. The composition of claim 20 in which the curing agent is an aminoplast.

22. The composition of claim 21 in which the aminoplast is present in amounts of 10 to 70 percent by weight based on total weight of aminoplast and polyurethane.

23. The composition of claim 20 in which the curing agent is a polyisocyanate.

24. The composition of claim 23 in which the polyisocyanate is a blocked polyisocyanate.

25. The composition of claim 20 which additionally contains crosslinked polymeric microparticles.

* * * * *